May 1, 1934.  E. M. WYATT ET AL  1,956,607
METHOD OF MAKING BUILDING UNITS
Original Filed Aug. 27, 1929
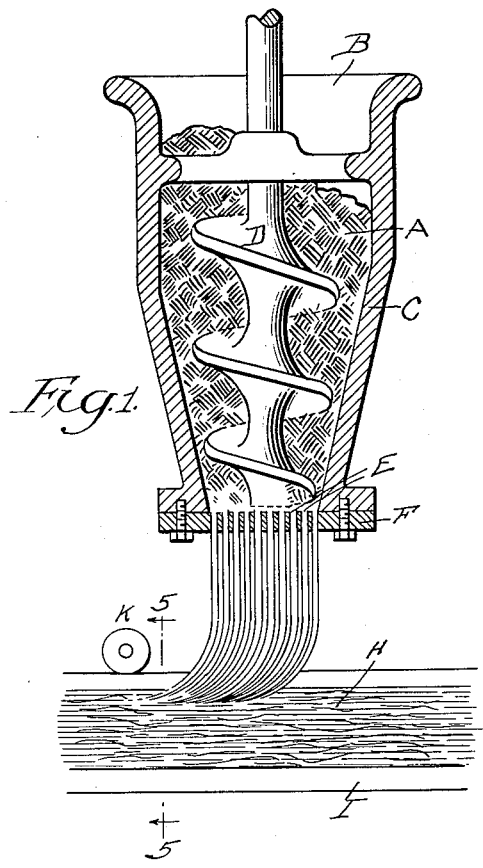
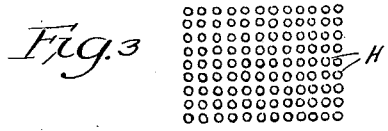
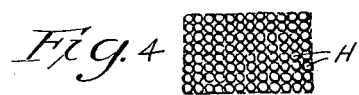
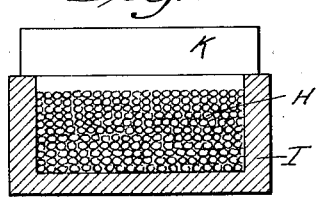
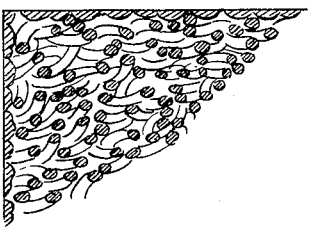
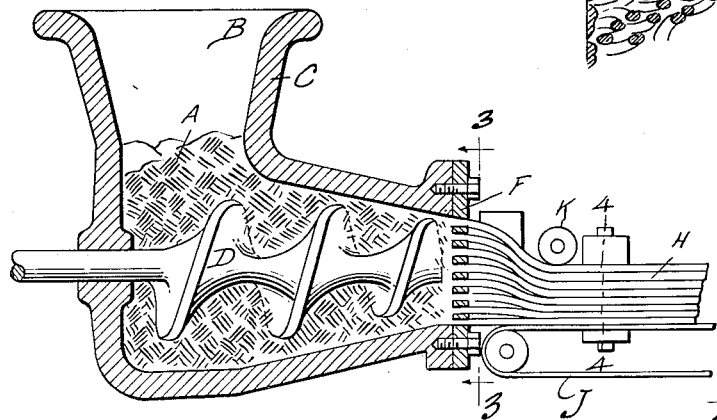
Inventors.
Edwin M. Wyatt and
Kemper Slidell Patented May 1, 1934

1,956,607

UNITED STATES PATENT OFFICE 1,956,607

METHOD OF MAKING BUILDING UNITS

Edwin M. Wyatt, Cleveland, Ohio, and Kemper Slidell, Madison, Wis., assignors to American Face Brick Research Corporation, a corporation of Illinois Original application August 27, 1929, Serial No. 388,828. Divided and this application December 26, 1930, Serial No. 504,740

24 Claims. (Cl. 25—156)

This invention relates to a process of producing a building unit which is formed from a mass of thin strings or strips of clay which are run in parallel relation, or are interlaced, interwoven, or otherwise assembled into a mass of rectangular or other form, and afterwards baked or burned to produce a building unit. The present application is a division of application Serial No. 388,828, filed August 27, 1929, which has become Patent 1,843,184.

The rod-like strings of which the present unit is composed are extruded from a perforated die in the form of spaghetti, the diameters of which may vary, and while in the flexible or plastic state are run out in parallel relation, or are intercoiled, interlaced, or otherwise bundled, either directly as they flow from the die or shortly afterwards while they are still in the wet or plastic condition.

The building unit thus composed may be used for various purposes where a light, porous insulating and soundproof material is desired. Such a unit is advantageous to manufacture, because the voids within it save material, and because the voids permit of air circulation that permits of more rapid drying and burning than is possible with solid units.

Where a wall surface having a rough undulating texture is sought, the strings or continuous cylinders forming the surface layers of the blocks may be allowed to remain in their matted, bundled or intercoiled condition, undisturbed by troweling or other compressible or deformative action, so that the surfaces will display the individual string-like appearance of the constituents of which the block is composed.

The building unit of the present invention may be finished in various ways, either by smoothing the surface with a troweling action before drying and firing, or by extruding strips along the edges of the die, which later are brought into contact one with the other, to thus form a continuous smooth surface on all four sides of the extruding column.

Other objects and details will appear from a description of the invention, in conjunction with the accompanying drawing, wherein,—

Figure 1 is a vertical center line sectional view illustrating one of the methods of building up the unit of the present invention;

Fig. 2 is another sectional drawing showing a variation of extruding the material in a horizontal direction for building up the unit of the present invention;

Fig. 3 is a cross sectional view on the line 3—3 of Fig. 2;

Fig. 4 is a cross sectional view on the line 4—4 of Fig. 2;

Fig. 5 is a cross sectional view on the line 5—5 of Fig. 1; and

Fig. 6 is a partial sectional view on a somewhat larger scale, through a corner of a completed unit made at random, showing commingling of the constituent material, and with rolled or troweled down exterior surfaces.

In producing the building unit of the present invention, a mass of clay A in relatively plastic condition is introduced through the hopper B of an extruding device C having an auger D, which latter device, by revolving, forces the clay through a number of small orifices E of a die plate F. See Figs. 1 and 2.

The material flows from the die orifices in the form of strings resembling spaghetti, the cross sectional size and configuration of which may vary, and as it flows from the die the strings are accumulated in a pile H, which is preferably a continuously forming column of rectangular cross section. As shown in Figure 1, this mass H may be accumulated in a trough-like mold I, where it may be built up to the desired depth by passing the trough slowly under the extending clay, so that the strings pile up in uncontrolled pattern or by the trough being passed by circular, sinuous reciprocating, or other planned movement that builds the strings of clay up in matted or interwoven structure. If desired, a mold of any other form or character may be used in lieu of the trough shown and described.

As shown in Figs. 2, 3 and 4, the mass H is accumulated with the strings in parallel relation to a synchronized moving belt or conveyor J. In either method, the mass is somewhat deformed and compressed by means of rollers K.

If desired, the mass can be more or less compacted by pressure from time to time, or can be compressed by any suitable means to give a more accurate configuration to the mass, or if desired the surface while still in the plastic state, may be smoothed down by troweling or the like, to give a practically continuous planate surface formation, without, however, subjecting the mass as a whole to sufficient compression to cause the strings of material to coalesce or lose their integrity. However, in view of the fact that the strings, when fed, are in a somewhat sticky or adherent condition, the mass as a whole will adhere together sufficiently to maintain its shape in preparation for the cutting, drying and firing operations.

In either variation of the method so far described, that is, illustrated in Figure 1 or in Figure 2, the compacted columns H are cut into suitable lengths for building units, as are stiff mud bricks, and by suitable devices, or similar to those used in brick manufacture (not shown).

The mass, in the resulting form of a block made up as above described, will be dried, and thereafter fired at a temperature sufficiently high to burn the material to the desired degree, which will depend more or less upon the purpose for which the block is intended. At temperatures of from 1500° F. to 1800° F., the material will be burned without fusion, in most cases, but if it is desired to have the strings of material fused together, the temperature can be elevated slightly, which will fuse the material sufficiently to cause the contacting surfaces of the clay strings to fuse together, without, however, destroying the porosity of the block, due to the interstices between the strings or strips of material.

By properly regulating the atmosphere within the kiln or furnace, the surface of the block may be given the desired coloration, or suitable materials may be sprinkled upon the surface, or the surface may be suitably scarified or impressed to impart the desired color and texture.

After the block has been fired to the desired degree, it is preferred to subject it to a slow cooling, to toughen the structure and prevent cracking or disintegration due to temperature shock.

Although the invention has been described with considerable particularity as to detail, it is to be understood that variations are contemplated, and that the drawing and description serve simply to exemplify one method of carrying out the process and producing the product of the present invention.

We claim:

1. The process of producing a building block which consists in manipulating argillaceous material while in the plastic state to form separated particles, accumulating said particles into a porous mass of adhering particles without destroying the interstices between the particles, and firing the mass to form a porous block.

2. The process of producing a building block which consists in manipulating argillaceous material while in the plastic state to form separated particles, accumulating said particles upon a surface having relative movement with respect to the point of deposit of said particles to build up a mass of adherent particles while maintaining the porosity of the mass, and firing the mass to form a porous block.

3. The process of producing a building block which consists in extruding argillaceous material while in the plastic state from a die and in dividing the mass while in the process of extrusion into a multiplicity of particles, massing such particles together into a porous block in a manner to cause adhesion of the particles without complete integration of the mass, and firing the block of material.

4. The process of producing a building block which consists in extruding argillaceous material while in the plastic state from a die and in dividing the mass while undergoing extrusion to form a multiplicity of particles, messing such particles together on a surface while the die and surface are subjected to relative movement to one another to build up a porous block formed of adherent particles, and firing the block of material.

5. The process of producing a building block which consists in extruding argillaceous material while in the plastic state from a die and in dividing the mass while undergoing extrusion to form a multiplicity of particles, massing such particles together on a surface while the die and surface are subjected to relative movement to one another to build up a porous block formed of adherent particles, and firing the block of material, and, after firing, slowly cooling the block to toughen the structure to prevent cracking or disintegration due to temperature shock.

6. The process of producing a building block which consists in extruding argillaceous material while in the plastic state from a die in the form of spaghetti-like strings, massing such strings together to build up a block, and firing the block of material.

7. The process of producing a building block which consists in extruding argillaceous material while in the plastic state from a die in the form of spaghetti-like strings, massing such strings together to build up a block, and firing the block of material under controlled conditions to secure the desired surface color.

8. The process of producing a building block which consists in extruding argillaceous material while in the plastic state from a die in the form of spaghetti-like strings, massing such strings together to build up a block, and firing the block of material under controlled conditions to secure the desired surface color, and after firing slowly cooling the block to toughen the structure to prevent cracking or disintegration due to temperature shock.

9. The process of producing a building block which consists in extruding argillaceous material while in the plastic state from a die in the form of spaghetti-like strings, and arranging such strings in contiguous relation with one another to build up a mass of the desired size and shape, compacting the mass to give the desired definition and to cause adherence of the strings of material while still plastic, and drying and firing the block of material.

10. The process of producing a building block which consists in extruding argillaceous material while in the plastic state from a die in the form of spaghetti-like strings and arranging such strings in contiguous relation with one another to build up a mass of the desired size and shape, then drying and firing the block of material at a temperature sufficient to cause adherence of the strings by fusion without destroying the porous character of the mass.

11. The process of producing a building block which consists in extruding argillaceous material while in the plastic state from a die in the form of spaghetti-like strings, and arranging such strings in contiguous relation with one another to build up a mass of the desired size and shape, compacting the mass to give the desired definition and to cause adherence of the strings of material while still plastic, then surfacing the mass to give smooth surfaces on the column, and drying and firing the block of material at a temperature sufficient to cause adherence of the strings by fusion without destroying the porous character of the mass.

12. The process of producing a building block which consists in extruding argillaceous material while in the plastic state from a die in the form of spaghetti-like strings, and arranging such strings in contiguous relation with one another to build up a mass of the desired size and shape, then forming smooth surfaces on the column, and drying and firing the block of material at a temperature sufficient to cause adherence of the strings by fusion without destroying the porous character of the mass.

13. The process of producing a building block which consists in extruding argillaceous material while in the plastic state from a die in the form of spaghetti-like strings, massing such strings together in a mold to build up a block, and firing the block of material.

14. The process of producing a building block which consists in extruding argillaceous material while in the plastic state from a die in the form of spaghetti-like strings, massing such strings together into a block, and cutting the block into units of desired size and shape.

15. The process of producing a building block which consists in extruding argillaceous material while in the plastic state from a die in the form of spaghetti-like strings, massing such strings together in a mold while the die and mold are subjected to relative movement to one another to build up a block having the strings massed together in a formation determined by the speed of extrusion in relation to the speed and direction of relative movement, and firing the block of material.

16. The process of producing a building block which consists in extruding argillaceous material while in the plastic state from a die in the form of spaghetti-like strings, massing such strings together in a mold while the die and mold are subjected to relative movement to one another to build up a block having the strings massed together in a formation determined by the speed of extrusion in relation to the speed and direction of relative movement, and cutting the block into units of desired size and shape.

17. The process of producing a building block which consists in extruding argillaceous material while in the plastic state from a die in the form of spaghetti-like strings, massing such strings together in a mold while the die and mold are subjected to relative movement to one another to build up a block having the strings massed together in a formation determined by the speed of extrusion in relation to the speed and direction of relative movement, and firing the block of material, and cutting the block into units of desired size and shape.

18. The process of producing a building block which consists in extruding argillaceous material while in the plastic state from a die in the form of spaghetti-like strings, arranging such strings in contiguous relation upon a supporting surface while the die and surface are in relative movement to one another to build up a mass of the desired size and shape, and having the strings arranged in a relation to one another determined by the speed of extrusion and the speed and direction of relative movement, compacting the mass to give the desired definition and cause adherence of the strings of material while still plastic, and drying and firing the block of material at a temperature sufficient to cause adherence of the strings by fusion without destroying the porous character of the mass.

19. The process of producing a building block which consists in extruding argillaceous material while in the plastic state from a die in the form of spaghetti-like strings, arranging such strings in contiguous relation upon a supporting surface while the die and surface are in relative movement to one another to build up a mass of the desired size and shape, and having the strings arranged in a relation to one another determined by the speed of extrusion and the speed and direction of relative movement, compacting the mass to give the desired definition and cause adherence of the strings of material while still plastic, then surfacing the mass to give a smooth surface thereto, and drying and firing the block of material at a temperature sufficient to cause adherence of the strings by fusion without destroying the porous character of the mass.

20. A method of manufacturing a filamentous fluid pervious body comprising the preparation of a plastic inorganic material, formation thereof into filamentary strands and the placing thereof in contacting intersupporting arrangement providing a high percentage of mutually intercommunicating voids therebetween and a multiplicity of internal surfaces defining said voids, said voids being open to the surface of said body, and then causing said strands to interbond to form an integral body.

21. A method of manufacturing a filamentous fluid pervious body as set forth in claim 20, said filamentary strands being placed in symmetric geometric relative interarrangement providing mutually intercommunicating voids of predetermined size and shape within said body.

22. A method of manufacturing a filamentous fluid pervious body comprising the preparation of a plastic inorganic material, the extrusion thereof through a die in such a manner as to form and place elongated strands of such material in contacting intersupporting relation providing a high percentage of mutually intercommunicating voids therebetween and a multiplicity of internal surfaces defining said voids, said voids being open to the surface of said body, and then causing said strands to interbond to form an integral body.

23. A method of manufacturing a filamentous fluid pervious body comprising the preparation of a plastic ceramic material, formation thereof into filamentary strands and the placing thereof in contacting intersupporting relation providing a high percentage of mutually intercommunicating voids therebetween and a multiplicity of internal surfaces defining said voids, said voids being open to the surface of said body, and then causing said strands to interbond by the application of heat to form an integral body.

24. A method of manufacturing a filamentous fluid pervious body comprising the preparation of a plastic ceramic material, the extrusion thereof through a die to form and place elongated strands of such material in contacting intersupporting relation providing a high percentage of mutually intercommunicating voids therebetween and a multiplicity of internal surfaces defining said voids, said voids being open to the surface of said body, and then causing said strands to interbond by the application of heat to form an integral body.

EDWIN M. WYATT.
KEMPER SLIDELL.